No. 639,109. Patented Dec. 12, 1899.
J. A. STÄCKIG & O. CARLSON.
WEIGHING APPARATUS.
(Application filed Jan. 20, 1899.)
(No Model.)
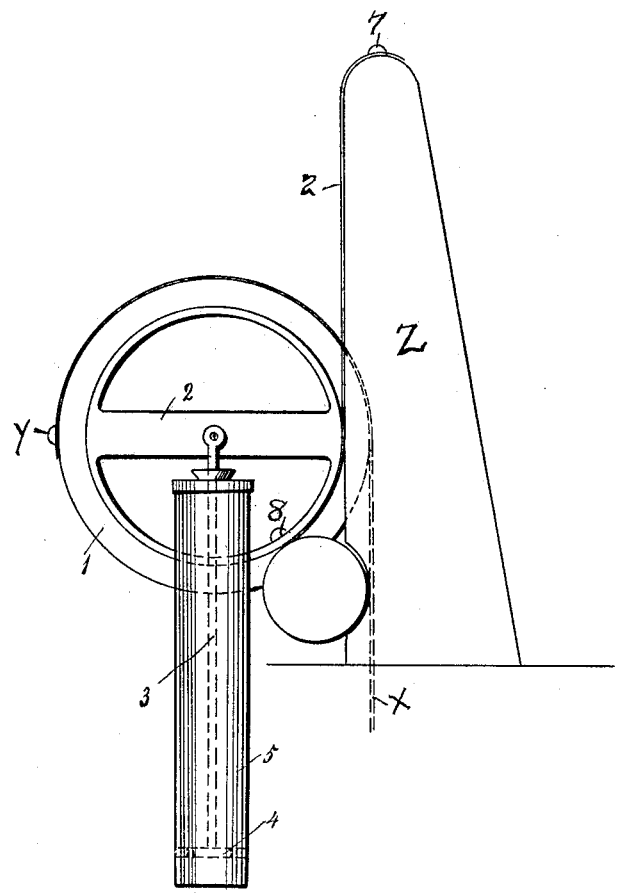
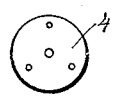
Attest
Inventors
Johan A. Stäckig
Otto Carlson

UNITED STATES PATENT OFFICE.

JOHAN AUGUST STÄCKIG AND OTTO CARLSON, OF STOCKHOLM, SWEDEN.

WEIGHING APPARATUS.

SPECIFICATION forming part of Letters Patent No. 639,109, dated December 12, 1899.

Application filed January 20, 1899. Serial No. 702,858. (No model.)

*To all whom it may concern:*

Be it known that we, JOHAN AUGUST STÄCKIG and OTTO CARLSON, of Stockholm, Sweden, have invented certain new and useful Improvements in Weighing Apparatus, of which the following is a full, clear, and exact specification.

This invention relates to weighing apparatus of the kind wherein the weight or load is suspended from a band placed around a counterweighted rolling cylinder, and has for its object to obtain an even or steady movement of the rolling cylinder and of the pointer in connection therewith.

As will be seen from the accompanying drawing, which illustrates weighing apparatus made according to our invention, we arrange in the center of the rolling cylinder 1 on a diametrical rib 2 a pin, from which is movably suspended a rod 3, provided at its lower end with a piston 4, capable of moving freely up and down inside a cylinder 5. This cylinder, which is firmly attached to the frame of the apparatus, is filled with a suitable liquid, such as glycerin. If necessary, the piston 4 may be provided with perforations.

By the up-and-down movement of the rolling cylinder 1 the rod 3 and the piston 4 will be moved inside the cylinder 5, whereby the glycerin is forced between the piston and the cylinder-wall or through the perforations in the piston, so that the movement of the rolling cylinder and pointer is rendered even and steady.

The load is suspended by the strap X, attached at $y$ to the cylinder, while the cylinder is held to the post Z in rolling contact by the strap 2, connected to the post and to the cylinder at 7 and 8, respectively. The cylinder rolls on the post under the weight of the load, and the rod being attached to the center of the cylinder follows the movement.

Any suitable weight-indicator may be connected to the rolling cylinder—such, for instance, as in our application for Letters Patent of the United States of even date herewith, Serial No. 702,857.

Having now particularly described and ascertained the nature of our said invention and in what manner the same is to be performed, we declare that what we claim is—

In combination, the post, the rolling cylinder, the band connecting the cylinder and post, the band for supporting the load attached to the cylinder, the cylinder 5 in fixed relation to the rolling cylinder and the piston and rod, the said rod being attached to the center of the rolling cylinder, substantially as described.

In witness whereof we have hereunto set our hands in presence of two witnesses.

JOHAN AUGUST STÄCKIG.
OTTO CARLSON.

Witnesses:
HUGO PALMQUIST,
J. NILSSON.